United States Patent
Sheriff et al.

(10) Patent No.: US 11,696,319 B2
(45) Date of Patent: *Jul. 4, 2023

(54) REDUCING INTERFERENCE IN CBRS NETWORKS

(71) Applicant: Cisco Technology, Inc., San Jose, CA (US)

(72) Inventors: Akram Sheriff, San Jose, CA (US); Santosh Ramrao Patil, Santa Clara, CA (US); Gangadharan Byju Pularikkal, San Jose, CA (US); Mark Grayson, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,035

(22) Filed: Jul. 19, 2021

(65) Prior Publication Data

US 2021/0352675 A1 Nov. 11, 2021

Related U.S. Application Data

(63) Continuation of application No. 16/569,416, filed on Sep. 12, 2019, now Pat. No. 11,089,602.

(51) Int. Cl.
*H04W 72/541* (2023.01)
*H04W 76/10* (2018.01)
(Continued)

(52) U.S. Cl.
CPC .......... *H04W 72/541* (2023.01); *H04W 8/08* (2013.01); *H04W 24/10* (2013.01);
(Continued)

(58) Field of Classification Search
CPC ......... H04W 8/08; H04W 8/18; H04W 8/186; H04W 16/14; H04W 24/10;
(Continued)

(56) References Cited

U.S. PATENT DOCUMENTS

2018/0279316 A1* 9/2018 Mueck ................ H04W 72/082
2019/0058999 A1* 2/2019 Gunasekara .......... H04W 16/14
(Continued)

FOREIGN PATENT DOCUMENTS

EP 2693792 A1 2/2014
WO 2011144251 A1 11/2011
(Continued)

OTHER PUBLICATIONS

International Search Report and Written Opinion from the International Searching Authority, dated Oct. 16, 2020, 12 pages, for corresponding International Patent Application No. PCT/US2020/048496.

*Primary Examiner* — Pao Sinkantarakorn
(74) *Attorney, Agent, or Firm* — Polsinelli

(57) ABSTRACT

Systems, methods, and computer-readable media for radio resource management in a Citizens Broadband Radio Service (CBRS) network include one or more CBRS devices (CBSDs) which can obtain a group type associated with the CBSDs and their associated Radio Environment Map (REM) reports of one or more frequency channels of the CBRS network. The group type and the REM reports may be provided to a Self-Organizing Network (SON) manager of the CBRS network, where the SON manager may determine and provide to the CBSDs, one or more of a channel utilization information, transmission power, or mobility load management information for the CBSD, based on the group type and the REM reports.

15 Claims, 7 Drawing Sheets

(51) Int. Cl.
*H04W 8/08* (2009.01)
*H04W 24/10* (2009.01)
*H04W 72/542* (2023.01)
*H04W 84/18* (2009.01)
*H04W 92/20* (2009.01)

(52) U.S. Cl.
CPC ......... *H04W 72/542* (2023.01); *H04W 76/10* (2018.02); *H04W 84/18* (2013.01); *H04W 92/20* (2013.01)

(58) Field of Classification Search
CPC ........... H04W 72/0433; H04W 72/082; H04W 72/085; H04W 76/10; H04W 84/18; H04W 92/10; H04W 92/12; H04W 92/20
See application file for complete search history.

(56) References Cited

U.S. PATENT DOCUMENTS

| | | |
|---|---|---|
| 2019/0174359 A1 | 6/2019 | Hannan |
| 2019/0394678 A1 | 12/2019 | Syed et al. |
| 2020/0146008 A1 | 5/2020 | Sevindik et al. |
| 2021/0344432 A1* | 11/2021 | Balachandran ....... H04W 16/14 |

FOREIGN PATENT DOCUMENTS

| | | |
|---|---|---|
| WO | 2018172367 A1 | 9/2018 |
| WO | 2019070095 A1 | 4/2019 |

* cited by examiner

500 ⟶

```
┌─────────────────────────────────────────────────────────────┐
│ OBTAIN, BY A CITIZENS BROADBAND RADIO SERVICE (CBRS) DEVICE │
│                 (CBSD), A GROUP TYPE ASSOCIATED WITH THE CBSD│
│                              502                            │
└─────────────────────────────────────────────────────────────┘
                              │
                              ▼
┌─────────────────────────────────────────────────────────────┐
│ OBTAIN, BY THE CBSD, A RADIO ENVIRONMENT MAP (REM) REPORT   │
│ OF ONE OR MORE FREQUENCY CHANNELS OF THE CBRS NETWORK       │
│                              504                            │
└─────────────────────────────────────────────────────────────┘
                              │
                              ▼
┌─────────────────────────────────────────────────────────────┐
│ PROVIDE THE GROUP TYPE AND THE REM REPORT TO A SELF-ORGANIZING│
│         NETWORK (SON) MANAGER OF THE CBRS NETWORK            │
│                              506                            │
└─────────────────────────────────────────────────────────────┘
                              │
                              ▼
┌─────────────────────────────────────────────────────────────┐
│ RECEIVE, FROM THE SON MANAGER, ONE OR MORE OF A CHANNEL     │
│ UTILIZATION INFORMATION, TRANSMISSION POWER, OR MOBILITY    │
│ LOAD MANAGEMENT INFORMATION FOR THE CBSD, BASED ON THE      │
│ GROUP TYPE AND THE REM REPORT                               │
│                              508                            │
└─────────────────────────────────────────────────────────────┘
```

FIG. 5

REDUCING INTERFERENCE IN CBRS NETWORKS

CROSS-REFERENCE TO RELATED APPLICATION

This application is a continuation of U.S. Non-Provisional patent application Ser. No. 16/569,416, filed on Sep. 12, 2019, the full disclosure of which is hereby expressly incorporated by reference in its entirety.

TECHNICAL FIELD

The present technology pertains to utilization of the Citizens Broadband Radio Service (CBRS) spectrum for private networks. More specifically, some aspects are directed to reducing interference among CBRS devices (CBSDs) of a private network.

BACKGROUND

The Citizen Broadcast Radio Service (CBRS) is a 150 MHz wide spectrum in the 3550-3700 MHz frequency range in the United States. Some of this spectrum is used by the United States government for their radar systems. When portions of the spectrum are not in use, those portions can be made available for use by other entities. The Federal Communications Commission (FCC) created rules for commercial use of the CBRS spectrum. Enterprises can use this CBRS spectrum to set up private Long-term Evolution (LTE) networks and allow access to consumer and Internet of Things (IoT) devices. Enterprises may expand and increase the coverage density of private LTE networks by integrating CBRS into their wireless connectivity services. CBRS style shared spectrum in some other bands is also being planned in Europe and some other parts of the world.

The CBRS spectrum use is governed by a three-tiered spectrum authorization framework (incumbent access, priority access, general authorized access) to accommodate a variety of commercial uses on a shared basis with incumbent federal and non-federal users of the band. Incumbent access users include authorized federal and grandfathered fixed satellite service users. Priority access consists of Priority Access Licenses (PALs) assigned to competitive bidding within the band. Lastly, General Authorized Access (GAA) is licensed-by-rule to permit open, flexible access to any portion of the band not assigned to any of the two higher tiers with respect to the widest possible group of potential users. The access and operations for the band across the three different tiers can be managed by a dynamic Spectrum Access System (SAS). The SAS can allocate resources to different GAA and PAL users of the CBRS network by allocating resources to CBRS enterprise access points (APs).

In existing CBRS deployments, a contiguous block of radio spectrum is allocated to all the CBRS users located in a particular region (e.g., in a private network such as an enterprise network). However, there is a lack of efficient techniques for Radio Resource Management (RRM) amongst the CBRS APs for reducing interference among the users of the spectrum managed by the different CBRS APs of an enterprise, for example. The current deployments also do not have the capability for intelligently managing the CBRS spectrum within the different CBRS bands which may be used by the enterprise network, for example. It is noted that while the FCC rules mandate the use of the CBRS spectrum to the extent that licensed users are protected from unlicensed users, there are no existing rules or requirements for the use of CBRS bands by unlicensed (e.g., GAA) users within a private LTE network such as an enterprise network utilizing the CBRS spectrum.

The lack of such rules within the CBRS specifications poses several challenges because the CBRS spectrum utilizes LTE radio technology. For example, LTE has been designed with centralized radio coordination as a focus. However, the private LTE networks may be operated by a single operator or hybrid operators/enterprises which control resource allocation within the entire enterprise network. In the absence of well-defined interference management protocols for accessing the CBRS spectrum, there may be a high incidence of interference within the private LTE network, causing throughputs and resource utilization to be suffer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a CBRS network architecture with a DNA-C, according to example aspects of this disclosure;

FIG. 5 illustrates a flow chart of an example processes for managing resources of a CBRS network, according to example aspects of this disclosure;

DETAILED DESCRIPTION

Figure 1:
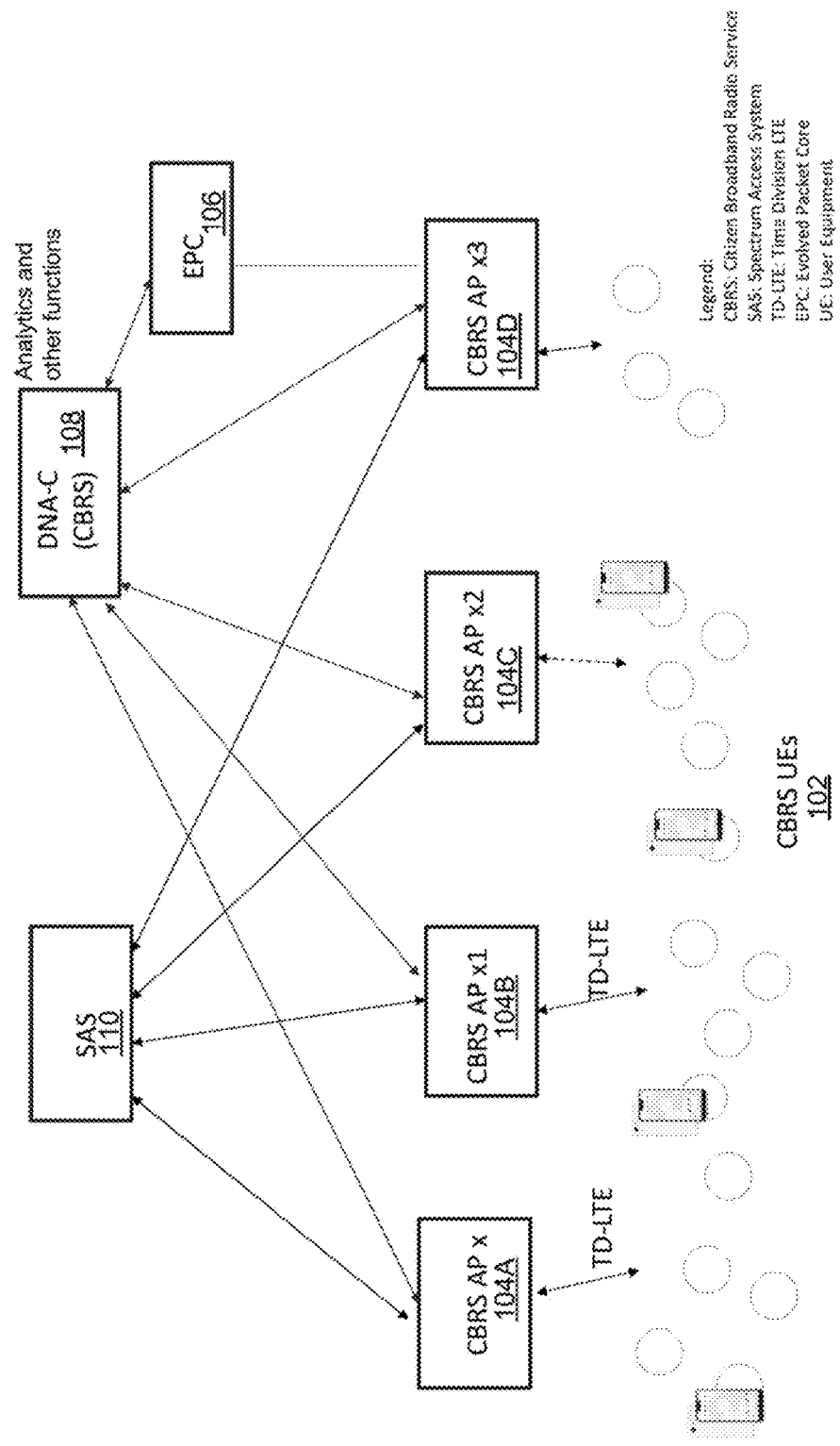
FIG. 1 illustrates a CBRS network architecture, according to some implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods, and computer-readable media for radio resource management in a Citizens Broadband Radio Service (CBRS) network, which include one or more CBRS devices (CBSDs) which can obtain a group type associated with the CBSDs and their associated Radio Environment Map (REM) reports of one or more frequency channels of the CBRS network. The group type and the REM reports may be provided to a Self-Organizing Network (SON) manager of the CBRS network, where the SON manager may determine and provide to the CBSDs, one or more of a channel utilization information, transmission power, or mobility load management information for the CBSD, based on the group type and the REM reports In some examples, a method of radio resource management of a Citizens Broadband Radio Service (CBRS) network is disclosed. The method comprises obtaining, by a CBRS device (CBSD), a group type associated with the CBSD; obtaining, by the CBSD, a Radio Environment Map (REM) report of one or more frequency channels of the CBRS network; providing the group type and the REM report to a Self-Organizing Network (SON) manager of the CBRS network; and receiving, from the SON manager, one or more of a channel utilization information, transmission power, or mobility load management information for the CBSD, based on the group type and the REM report.

In some examples, a system for radio resource management of a Citizens Broadband Radio Service (CBRS) network is provided. The system comprises one or more processors; and a non-transitory computer-readable storage medium containing instructions which, when executed on the one or more processors, cause the one or more processors to perform operations including: obtaining, by a CBRS device (CBSD), a group type associated with the CBSD; obtaining, by the CBSD, a Radio Environment Map (REM) report of one or more frequency channels of the CBRS network; providing the group type and the REM report to a Self-Organizing Network (SON) manager of the CBRS network; and receiving, from the SON manager, one or more of a channel utilization information, transmission power, or mobility load management information for the CBSD, based on the group type and the REM report.

In some examples, non-transitory machine-readable storage medium, including instructions configured to cause a data processing apparatus to perform operations for radio resource management of a Citizens Broadband Radio Service (CBRS) network is provided. The operations include: obtaining, by a CBRS device (CBSD), a group type associated with the CBSD; obtaining, by the CBSD, a Radio Environment Map (REM) report of one or more frequency channels of the CBRS network; providing the group type and the REM report to a Self-Organizing Network (SON) manager of the CBRS network; and receiving, from the SON manager, one or more of a channel utilization information, transmission power, or mobility load management information for the CBSD, based on the group type and the REM report.

In some examples, obtaining the group type comprises receiving the group type in a spectrum inquiry request from a CBRS user equipment (UE) for establishing connection to the CBRS network through the CBSD.

In some examples, the CBSD is a master CBSD of a group of CBSDs associated with the group type, the group of CBSDs comprising the master CBSD and one or more peer CBSDs, and wherein obtaining the REM report comprises generating a consolidated REM report for the group of CBSDs, the consolidated REM report comprising a consolidation of REM reports of the group of CBSDs.

Some examples further comprise obtaining one or more REM reports of the one or more peer CBSDs over a virtual radio (X2) interface for communication between CBSDs of the group of CBSDs.

Some examples further comprise sharing mobility management information of CBRS user equipment (UE) connected to one or more CBSDs of the group of CBSDs over the X2 interface.

Some examples further comprise performing a handoff of a CBRS UE between two CBSDs of the group of CBSDs based on mobility information for the CBRS UE shared over the X2 interface between the two CBSDs.

In some examples, the REM report of the CBSD comprises one or more of a channel utilization percentage (%), channel hopping radio scanning report, identities of neighboring CBSDs, signal strength of neighboring CBSDs, interference graphs for neighboring CBSDs, or identity of a synchronization domain of the CBSD.

The examples in this overview are not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and embodiments, will become more apparent upon referring to the following specification, claims, and accompanying drawings.

DESCRIPTION OF EXAMPLE EMBODIMENTS

The disclosed technologies address the need in the art for managing resources of a Citizen Broadband Radio Service (CBRS) network in a way which reduces interference among the users of the CBRS network. In some examples, techniques are provided for efficient Radio Resource Management (RRM) by CBRS network elements such as a Self-Organizing Network (SON) module or SON manager. In some examples, a SON manager can be provided which can be collocated with a Domain proxy controller of a CBRS network such as a private LTE network or enterprise network. The SON manager may be configured to determine capacity and coverage optimization (CCO) for the CBRS APs (or CBRS devices (CBSDs)) and create a Radio Environment Map (REM) among the different CBSDs. Based on the REM, the SON manger can perform transmission power management and mobility load management of the CBSDs in the private LTE network in a manner which minimizes interference amongst the CBRS user equipment (UEs) accessing the private LTE network through the CBSDs.

In one example, the SON manager may employ CBRS grouping parameters for mapping the various CBSDs of a private LTE network into dedicated groups. The dedicated groups can have associated latitude/longitude coordinates and may include CBSDs which are geographically proximate one another. In some examples, the SON manager may control transmit power amongst CBSDs of a group in a manner which minimizes interference within the group.

In some examples, a dedicated virtual radio (X2) probing interface can be included in the CBSDs of the private LTE network. Each CBSD of the private LTE network may continuously scan radio frequency (RF) information in the CBRS spectrum (e.g., in a 3.5 GHZ mid band frequency) and create a Radio Environment Map (REM) report for the CBSD. The REM report created by a CBSD can include information regarding interference within channel allocated to the CBSD as well as interference amongst channels adjacent to the allocated channel for the CBSD. A master CBSD can be designated among the CBSDs of a group and the master CBSD may obtain the REM reports from the remaining CBSDs (also referred to as peer CBSDs) within the group through the X2 interface. The master CBSD may consolidate the REM reports from the various peer CBSDs of the group and provide a consolidated REM report to the SON manager. The consolidated REM report can include information regarding the active channel utilization among the various channels allocated to the CBSDs (as well as the respective adjacent channels of the CBSDs) of the group. The SON manager can perform efficient RRM of the channels for the group using the consolidated REM report.

In some examples, the X2 interface can also be used for exchanging mobility management information for the CBRS UEs between the different CBSDs of a group. In some examples, the CBSDs of a group may not be physically collocated, but may belong to the same Mobility Management Entity (MME). When the CBRS UEs crossover from one CBSD to another CBSD of the same group, the mobility management information exchange over the X2 interface can improve the efficiency of handover of the CBRS UE between the CBSDs. In some examples, the handover can be implemented without involving the core network elements such as an evolved packet core (EPC) in a manner which avoids packet loss. For example, utilizing the X2 interface for the handover can include forwarding packets for the CBRS UE over the X2 interface, which can avoid packet loss and disruption during the handover. In some examples, the handover can also include a stateful switchover (SSO) where states and context for the CBRS UE may be transferred between the CBSDs to retain connectivity to the CBRS network in a seamless manner. The above examples and additional features will be explained in further detail with reference to the figures in the following sections.

FIG. 1 illustrates an example architecture of a CBRS network 100. In the CBRS network 100, the CBRS spectrum can be used with long-term evolution (LTE) technology to support private LTE networks. Similar to LTE networks, the CBRS network 100 can include an eNodeB, Core Network for Packet services and IMS for voice and multimedia services. In addition to the traditional LTE networks, the CBRS network 100 can include an additional node shown as a Spectrum Access System (SAS) 100 to manage and control access to the CBRS network 100. The SAS 110 can be implemented using a three-tier spectrum authorization framework to accommodate a variety of commercial uses on a shared basis with incumbent federal and non-federal users of the CBRS band.

The CBRS network 100 can be accessed by one or more user equipment (UEs), identified as CBRS UEs 102. The CBRS UEs 102 can include various computing and networking devices such as mobile devices, laptops, desktops, etc. One or more access points, identified as CBRS APs 104A-D, for example, can control and provide network access to the CBRS UEs 102. In some examples, the CBRS APs 104A-D can include an Evolved Node B (eNodeB), a CBRS base station or CBRS device (CBSD), etc. The CBRS APs 104A-D can belong to different networks or enterprises, e.g., a private LTE network, and may communicate directly with the CBRS UEs 102 of that network. The CBRS APs 104A-D, CBSDs or eNodeBs configured to support the CBRS band can be categorized into two types: CBSD-Category A and CBSD-Category B As previously mentioned, the SAS 110 can manage the three-tier license structure for the following types of access. The first access license referred to as an Incumbent Access (IA) is an access license used by the US Navy and also for fixed satellite services (FSS). The IA access has absolute priority over other type of allocation.

The second access license referred to as a Priority Access License (PAL) is an access license which can be used by hospitals, utilities and government departments as well as non-critical users such as mobile network operators (MNOs). The PAL is assigned using competitive bidding to various enterprises and commercial users within the 3550-3650 MHz frequency block of the CBRS spectrum. Each access license under the PAL is defined as a non-renewable authorization to use a 10 megahertz channel in a single census tract (e.g., in a contained location or small geographic area/district) for a fixed period, e.g., three years. Up to seven total PALs may be assigned in any given census tract with up to four PALs being granted to any single applicant. Applicants may acquire up to two consecutive PAL terms in any given license area during the first auction.

The third access license referred to as a General Authorized Access (GAA) is provided to users who can potentially have access to all 150 megahertz in the 3550-3700 MHz spectrum. GAA users are permitted to use any portion of the 3550-3700 MHz band (generally a middle of a 3.5 GHz band) not assigned to a higher tier user and may also operate opportunistically on unused Priority Access channels.

The SAS 110 can control operation of the CBRS APs 104A-D based on the three-tiered licensing model. In some examples the SAS 110 can inform the CBRS APs 104A-D of frequency bands or channels to use in the CBRS spectrum and transmit/receive powers for any specific time or time period. An interface between the SAS 110 and the CBRS APs 104A-D can be based on the HTTP over Transport Layer Security (HTTP-TSL) protocol. The interface can include exchanges of messages for the following operations: a CBSD Registration Request/Response, a Spectrum Inquiry Request/Response, a Grant Request/Response, and a Heartbeat Request/Response. Examples of exchanges between the SAS 110 and the CBRS APs 104A-D will be discussed with reference to FIG. 3.

An evolved packet core (EPC) 106 can also be deployed within the CBRS network 100. The EPC 106 can provide a variety of different functions for the CBRS network 100. For example, the EPC 140 can manage session states, authenticate, and manage communication associated with access points and/or user equipment within the CBRS network 100. The EPC 106 can also be used to route communications (e.g., data packets), manage quality of service (QoS), and provide deep packet inspection (DPI) functionality within the CBRS network.

The CBRS network 100 can also include a digital network architecture center (DNA-C) 108 configured to manage the CBRS APs 104A-D in addition to the SAS 110. For example, the DNA-C 108 can obtain the assignments of each of the CBRS APs 104A-D provided by the SAS 110. In some examples, the DNA-C 108 can monitor performance of the CBRS APs 104A-D and associated UEs 102 to detect when interference is present. In some examples, the DNA-C 108 can determine different parameters to assign to one or more of the CBRS APs 104A-D when interference is detected, and dynamically re-assign the operational parameters of the CBRS APs 104A-D to minimize and/or eliminate the detected interference. In this way, the DNA-C 108 can resolve issues of interference between the CBRS APs 104A-D and/or the CBRS UEs 102 that the SAS 110 may not be able to account for.

Figure 2:
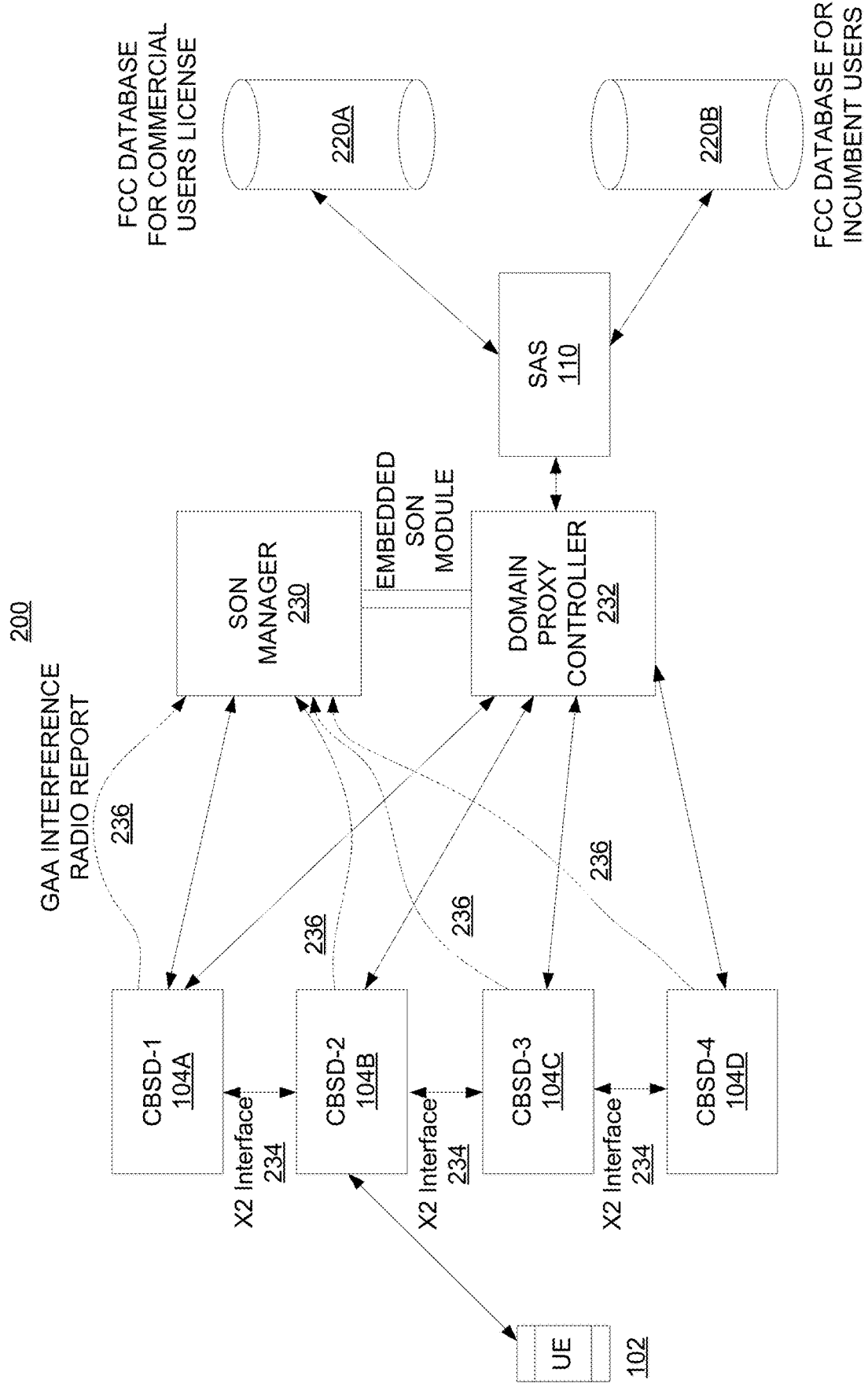
FIG. 2 illustrates a CBRS network deployment, according to example implementations.

FIG. 2 illustrates a deployment of a CBRS network 200, which may be configured according to the architecture of the CBRS network 100 discussed with reference to FIG. 1. For example, the CBRS network 200 can include CBRS APs 104A-D, which have been designated as CBRS devices (CBSDs) 1-4 in FIG. 2. Each of the CBSDs 104A-D can control access to the CBRS network 200 for one or more CBRS UEs such as the CBRS UE 102. The CBRS network 200 can also include a SON manager 230 and a domain proxy controller 232 which can be in communication with the SAS 110. The SAS 110 can manage access to the CBRS spectrum by referring to the FCC data base for commercial users licenses 220A and the FCC database for incumbent users 220B in some examples.

In some examples, the domain proxy controller 232 can communicate with the SAS 110 on behalf of the various CBSDs 104A-D. In some examples, the domain proxy controller 232 can be implemented as a logical entity that can represent one or more of the CBSDs 104A-D to the SAS 110. For example, the domain proxy controller 232 can present a consistent and secure interface to the SAS 110 that can convey all messages pertaining to the SAS-CBSD interface between the SAS 110 and the CBSDs 104A-D. In some examples, the domain proxy controller 232 can provide a translational capability to interface legacy radio equipment in the 3650-3700 MHz band with the SAS 110 to ensure compliance with CBRS technical specifications for operational and functional requirements.

In some examples, the SON manager 230 can interface with the domain proxy controller 232 by utilizing embedded SON module interfaces in some examples. The SON manager 230 can utilize the interfaces which provide information about network status. In some examples, the SON manager 230 can provide network control and interference management according to aspects of this disclosure. For example, the SON manager 230 can obtain information about the network utilization from one or more of the CBSDs and generate rules to improve spectrum utilization while minimizing interference between the CBSDs.

In some examples, the CBSDs 104A-D can include a virtual radio communication capability. For example, an X2 interface 234 is identified between the different CBSDs 104A-D. Any two CBSDs may be able to communicate between one another on the X2 interface 234. In some examples, the X2 interface can include a virtual radio such as a software-defined radio (SDR) interface which can be used for communication between two CBSDs. The X2 interface may be different from a physical radio or other communication path which may be used for communicating between the CBSDs 104A-D and the SON manager 230, for example. In some examples, the CBSDs 104A-D may be provided with a path such as the path 236 to communicate with the SON manager 230. In some examples, the physical radio of the CBSDs 104A-D can be mapped to the SON manager 230 and the virtual radio or X2 interface 234 can be used to communicate information among the CBSDs 104A-D even if the CBSDs 104A-D are operating on the same primary channel. The CBSDs 104A-D may use the X2 interface 234 to share mobility information related to their respective CBRS UEs 102 as well as channel utilization, radio environment, and interference information, as described below.

In some examples, the CBSDs 104A-D may each be capable of continuously scanning the radio frequency (RF) information in the CBRS spectrum (e.g., in a 3.5 GHZ mid band frequency) and create a Radio Environment Map (REM) report for the respective CBSD. The REM report can provide a GAA interference radio report which can be provided to the SON manager 230, e.g., via the path 236. In some examples, the REM report created by a CBSD can include information regarding interference within a channel of the GAA spectrum allocated to the CBSD as well as interference amongst channels adjacent to the allocated channel for the CBSD.

In some examples, the SON manager 230 can group the CBSDs 104A-D based on a grouping parameter or attribute which can be provided by the CBSDs 104A-D. For example, the SON manager 230 may employ CBRS grouping parameters for mapping the various CBSDs 104A-D of the same private LTE network such as the CBRS network 200 into dedicated groups. The dedicated groups can have associated latitude/longitude coordinates and may include CBSDs 104A-D which are geographically proximate one another. In some examples, the SON manager 230 may control transmit power amongst CBSDs 104A-D of the same group in a manner which minimizes interference within the group.

In some examples, an attribute such as a "cbrsaGroupType" defined by the CBRS standard for communicating between the CBSDs 104A-D and the SAS 110 can be used for grouping the CBSDs 104A-D. A "groupingParam" refers to an array of data objects which can include the cbrsa-GroupType attribute. The cbrsaGroupType can be included as part of the groupingParam or other information exchanged between the CBSDs 104A-D and the SAS 110. In some examples, the groupingParam may be included in a Registration Request packet from a CBRS UE 102 to the CBSDs 104A-D. The CBSD which provides a grant may include the groupingParam in a GrantRequest packet from the CBSD to the CBRS UE 102. In some examples, the grouping parameter can also be included in in a Spectrum Inquiry Request from the CBSDs 104A-D so that the SON manager 230 can be provided with the group type. In addition to the cbrsaGroupType, the SON manager 230 may use information such as co-location or geographical proximity of the CBSDs, number of active users or CBRS UEs 102 for the various CBSDs, synchronization domain, and LTE X2 handover mechanisms in performing groupings.

Figure 3:
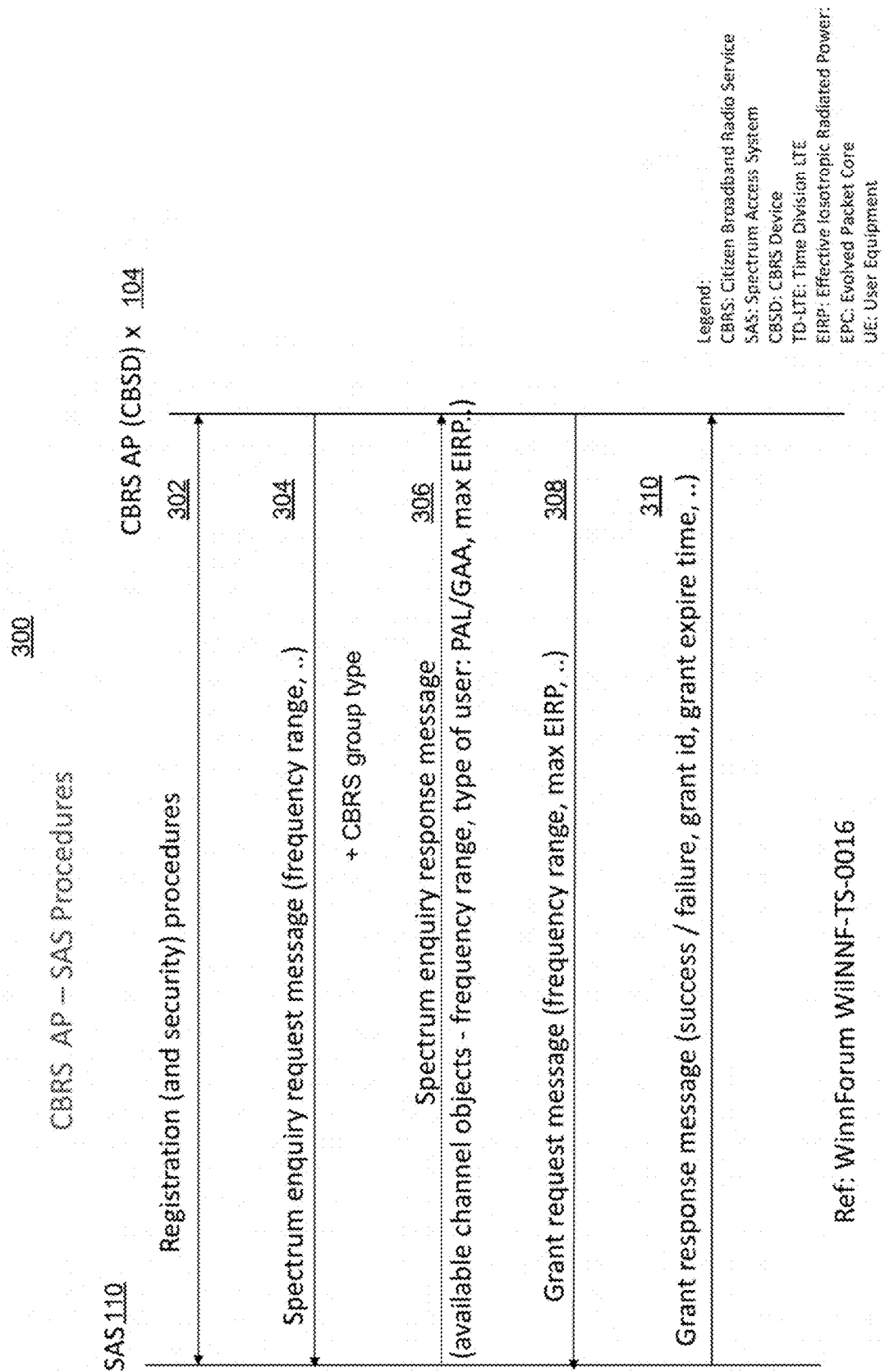
FIG. 3 illustrates a flow chart of message exchanges in a CBRS network, according to example aspects of this disclosure.

FIG. 3 illustrates a flow diagram 300 showing the interactions of the SAS 110 with a CBSD such as any of the CBSDs 104A-D (collectively referred to as a CBSD 104). When the CBRS APs 104A-D get powered on, they start an SAS-CBSD registration procedure with the SAS 110 to gain access to the CBRS spectrum. For example, in step 302, the CBSDs 104A-D can send their respective Registration Requests (along with other parameters required by the SAS 110). In some examples, the CBSDs 104A-D may include information obtained from their respective CBRS UEs 102 during the Registration Requests and security procedures. Based on the Registration Requests, registration and security procedures can be performed to identify the type of users or CBRS UEs 102 and what tier they are associated with. For example, the CBRS UEs 102 can include PAL and GAA devices of tiers 2 and 3, respectively. The CBSDs 104A-D can be provide corresponding access rules and policies to the CBRS UEs 102 for accessing the CBRS network 100 (or portion thereof) through respective CBSDs 104A-D, where these rules and policies can include a frequency channel which has been allocated to the CBSDs 104A-D.

In step 304, the CBRS AP 104 can send a Spectrum Inquiry Request to the SAS 110. For example, after a Registration Response from the SAS 110 indicating a successful registration, the CBSDs 104A-D can perform a Spectrum Inquiry for available channel information from the CBRS spectrum. In example aspects, the CBSDs 104A-D can include the CBRS group type or groupingParam in the Spectrum Inquiry Request.

In step 306, the SAS 110 can provide a Spectrum Inquiry Response that includes information responsive to the Spectrum Inquiry Request sent by the CBSDs 104A-D in step 304. For example, the SAS 110 (after reviewing the available information about other access points and what portions of the broadcast band are currently in use) can provide available channels for the type of user (GAA/PAL) pertaining to the CBSDs 104A-D. Further, the Spectrum Inquiry Response from the SAS 110 can also include constraints on the CBSDs 104A-D in connection with the available CBRS channels (e.g., restrictions on frequency, maximum effective isotropic radiated power (EIRP), etc.).

In step 308, the CBSDs 104A-D can send a Grant Request Message to the SAS 110, which includes a request for grant of parameters such as the CBRS channels, maximum EIRP, CBRS grouping, etc., selected from the available CBRS channels indicated by the SAS 110 in step 306. The SAS 110 can then provide a Grant Response in step 310 indicating whether the requested parameters can be granted (success) or not (failure), based on the available resources that the SAS 110 can assign to the CBSDs 104A-D. Further, the SAS 110 can provide additional information in step 310 to the CBRS AP 104 which can include an expiration time or a duration for which the granted parameters would be available.

In some examples, the SON manager 230 can utilize the group type information to map the CBSDs 104A-D to one or more groups. For example, the grouping can be performed to minimize interference among the frequency channels granted to the different CBSDs 104A-D. For example, if two CBSDs are located geographically close to one another (e.g., based on their latitude and longitude coordinates), then they may experience interference within the same channel. In some examples, the SON manager 230 can control the max EIRPs for the geographically close CBSDs of a group in order to minimize interference among them. Additionally, the SON manager 230 can utilize a Radio Environment Map (REM) report for the CBSDs 104A-D in interference management, as described below.

Figure 4:
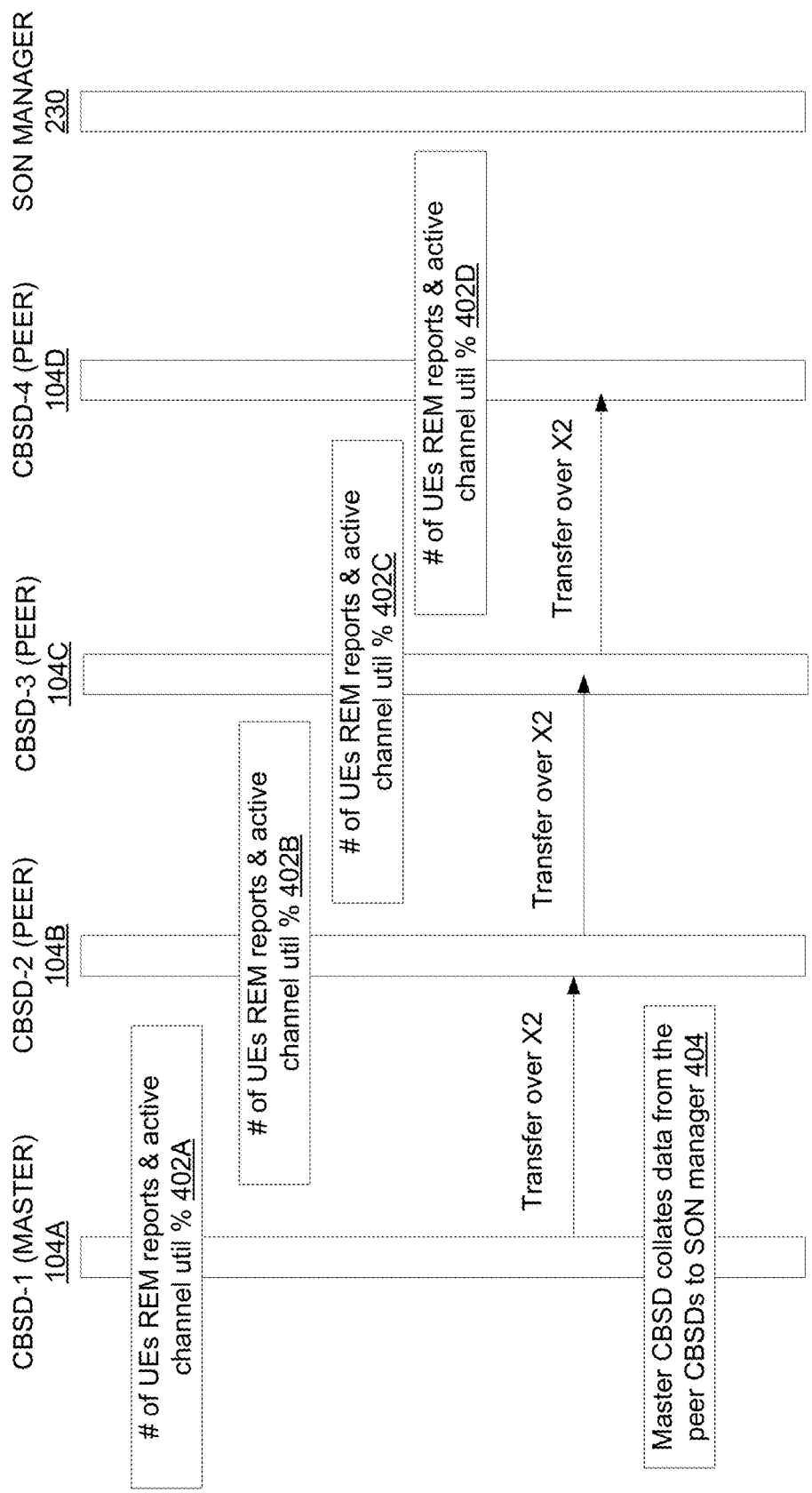
FIG. 4 illustrates message exchanges in a CBRS network, according to example aspects of this disclosure.

FIG. 4 is a diagram of a CBRS network 400 which illustrates example transfer of information over the X2 interface 234 and the physical radio. In the CBRS network 400, the CBSDs 104A-D can be identified as belonging to a group. For example, the CBSDs 104A-D may be grouped based on their group type or grouping parameter as discussed above. In some examples, the dedicated virtual radio (X2) probing interface may be utilized by the CBSDs 104A-D of the group to continuously scan all RF Information in the CBRS spectrum to create a Radio Environment Map (REM) report. The REM report can include interference within the allocated or assigned channels of the CBSD by the SAS 110, as well as with respect to neighboring or adjacent frequency channels.

Within the group, the CBSD 104A can be designated as a master CBSD in an illustrative example, and the remaining CBSDs 104B-D can be designated as peer CBSDs. The master CBSD 104A may obtain the REM reports from the peer CBSDs 104B-D through the X2 interface. In some examples, the master CBSD 104A may perform an inverse RF lookup or obtain an REM report (or RF measurement report) from the peer CBSDs 104B-D. In some examples, the master CBSD 104A may obtain the RF measurement information from the peer CBSDs 104B-D in a cascaded manner and populate the REM report. In some examples, the master CBSD 104A may generate an REM report 402A and obtain the REM reports 402B-D from the peer CBSDs 104B-D respectively over the X2 interface.

In some examples, REM reports 402A-D can each contain one or more of the following information or parameters: the number of active associated users or CBRS UEs that CBSD 104A-D, channel utilization percentage (%), channel hopping radio scanning report by the virtual radio (e.g., where the channel hops for every 10 seconds once), identities of neighboring CBSDs (e.g., detected through network scanning), signal strength (e.g., received signal strength indication (RSSI) of neighboring CBSDs), interference graphs for the neighboring CBSDs, identity of the synchronization domain the CBSDs belongs to (if any), etc. In some examples, the REM reports 402A-D can each include an RF interference graph or report for the channels allocated to the respective CBSDs 104A-D as well as those of neighboring/adjacent channels.

The master CBSD 104A may consolidate the REM reports from the various peer CBSDs of the group and provide a consolidated REM report 404 to the SON manager 230. The consolidated REM report 404 can include information regarding the active channel utilization among the various channels allocated to the CBSDs (as well as the respective adjacent channels of the CBSDs) of the group. The SON manager 230 can perform efficient Radio Resource Management (RRM) of the channels for the group using the consolidated REM report 404.

Accordingly, each CBSD of the group can report the various REM reports 402A-D which includes RF interference reports (e.g., for GAA users) to the SON manager 230 using the cascaded approach discussed above (e.g., using the consolidated REM report 404 sent from the master CBSD 104A). In some examples, the CBSDs 104A-D can additionally report their RF capabilities to the databases 220A-B, for example, with information pertaining to their respective location, antenna heights, class of the CBSDs, etc. (e.g., utilizing a JavaScript Object Notation (JSON) message exchange protocol.

In some examples, the SON manager 230 can utilize the REM reports and adaptively instruct the CBSDs 104A-D to change their transmit power or max EIRP as needed for the CBSDs using the same channel to minimize co-channel interference. In some examples, the SON manager 230 can perform dynamic channel ranking based on the REM reports. The SON manager 230 can perform channel allocation based on the channel utilization percentages on the various available channels, as obtained from the REM reports. In some examples, the SON manager 230 can allocate channels to the CBSDs 104A-D in a manner which improves channel utilization and reduces interference. For example, non-overlapping channels can be allocated to co-located or closely located CBSDs where possible, to minimize interference. In some examples, the maximum transmission powers can be adjusted when overlapping channels are utilized by closely located CBSDs.

In some examples, the REM reports can provide information to the SON manager 230 pertaining to why certain CBSDs are grouped together or belong to the same group. Based on this, the SON manager 230 can assign the channels or sub-channels appropriately to a CBSD from a contiguous block of channels in the CBRS spectrum which were assigned by SAS 110 to the SON manager 230 in some examples. This way, the channel utilization by each CBSD and each group of CBSD may be improved. In some examples, the SON manager 230 can adaptively change the channel/sub-channel allocations, transmit power, etc., thereby minimizing the interference in the CBRS spectrum by the GAA users.

In some examples, the X2 interface 234 of FIG. 2 can also be used for exchanging mobility management information for the CBRS UEs 102. For example, two or more of the CBSDs 104A-D of the same group may not be physically collocated. However, because the X2 interface 234 can be utilized to exchange mobility information, the CBSDs 104A-D may belong to the same Mobility Management Entity (MME). In some examples, a CBRS UE 102 may crossover from one CBSD (e.g., CBSD 104A) to another CBSD (e.g., CBSD 104B) of the same group. It is possible to implement the handover of the CBRS UE 102 from the CBSD 104A to the CBSD 104B using signaling which involves the core network (e.g., EPC 106 of FIG. 1). However, in such an implementation, during the transition time when handover processes are underway, the packets related to the CBRS UE 102 may either be dropped or rerouted through the core network, which can result in throughput loss. This throughput loss can cause the handover involving the core network to be very inefficient, especially if there is frequent channel switching activity. To overcome such inefficiencies, the X2 interface 234 can be utilized for mobility handoff in example aspects.

In some examples, the mobility handoff over the X2 interface 234 can include the exchange of mobility management information pertaining to the CBRS UE 102 over the X2 interface 234. For example, the CBSD 104A can forward packets related to the CBRS UE 102 over the X2 interface 234 to the CBSD 104B during the handover or handoff period. In some examples, utilizing the X2 interface 234 for the handoff can avoid involving the core network elements such as an evolved packet core (EPC) 106 during the handoff, while also avoiding rerouting or packet loss. In some examples, a final message can be sent by the newly associated CBSD 104B after the handover to inform the EPC 106 that the handover has been completed. Thus, the handover using the X2 interface 234 can also include a stateful switchover (SSO) where states and context for the CBRS UE 102 may be transferred between the CBSD 104A to the CBSD 104B, which retains connectivity to the CBRS network in a seamless manner. The CBSDs 104A-D can remain synchronized during handover and thus any disruption on packet transmission caused by the handover can be avoided or minimized.

Having described example systems and concepts, the disclosure now turns to FIG. 5 illustrating a flow chart of process 500 directed to a method of radio resource management of a Citizens Broadband Radio Service (CBRS) network. In some examples, the method The steps or blocks outlined herein are examples and can be implemented in any combination thereof, including combinations that exclude, add, or modify certain steps.

At block 502, the process 500 can include obtaining, by a CBRS device (CBSD), a group type associated with the CBSD. For example the CBSDs 104A-D can obtain a group type associated with the respective CBSDs during registration and grant from the SAS 110 as shown in FIG. 3. The CBSDs 104A-D can also obtain the group type associated with the CBSD during a spectrum inquiry from one or more of the CBRS UEs 102.

At block 504, the process 500 can include obtaining, by the CBSD, a Radio Environment Map (REM) report of one or more frequency channels of the CBRS network. For example, the CBSDs 104A-D can obtain the REM reports by probing their allocated channel as well as neighboring channels using the virtual radio interface. In some examples, the CBSD 104A can be a master CBSD of a group associated with the group type, and obtaining the REM report can include generating a consolidated REM report 404 which includes the REM report 402A of the master CBSD 104A and the REM reports 402B-D of one or more peer CBSDs 104B-D of the group. In some examples, the master CBSD 104A can obtain the REM reports of one or more peer CBSDs 104B-D of the group from the X2 interface for communicating amongst the CBSDs 104A-D of the group.

At block 506, the process 500 can include providing the group type and the REM report to a Self-Organizing Network (SON) manager of the CBRS network. For example, the CBSDs 104A-D may provide their respective group types to the SON manager 230 and the master CBSD 104A may provide the consolidated REM report 404 to the SON manager 230. In some examples, the REM reports 402A-D and/or the consolidated REM report 404 can include one or more of a channel utilization percentage (%), channel hopping radio scanning report, identities of neighboring CBSDs, signal strength of neighboring CBSDs, interference graphs for the neighboring CBSDs, or identity of a synchronization domain of the CBSD.

At block 508, the process 500 can include receiving, from the SON manager, one or more of a channel utilization information, transmission power, or mobility load management information for the CBSD, based on the group type and the REM report. For example, the SON manager 230 can utilize the consolidated REM report 404 and adaptively instruct the CBSDs 104A-D to change their transmit power or max EIRP as needed for the CBSDs using the same channel to minimize co-channel interference. In some examples, the SON manager 230 can perform dynamic channel ranking based on the consolidated REM report 404. The SON manager 230 can perform channel allocation based on the channel utilization percentages on the various available channels, as obtained from the REM reports. In some examples, the SON manager 230 can allocate channels to the CBSDs 104A-D in a manner which improves channel utilization and reduces interference. For example, non-overlapping channels can be allocated to co-located or closely located CBSDs where possible, to minimize interference. In some examples, the maximum transmission powers can be adjusted when overlapping channels are utilized by closely located CBSDs.

In some examples, the CBSDs 104A-D may share mobility management information of CBRS UEs 102 connected to the CBSDs of the group over the X2 interface 234. In some examples, a handoff of a CBRS UE 102 can be performed between two CBSDs (e.g., CBSD 104A and 104B) of the group based on mobility information for the CBRS UE 102 shared over the X2 interface between the two CBSDs.

Figure 6:
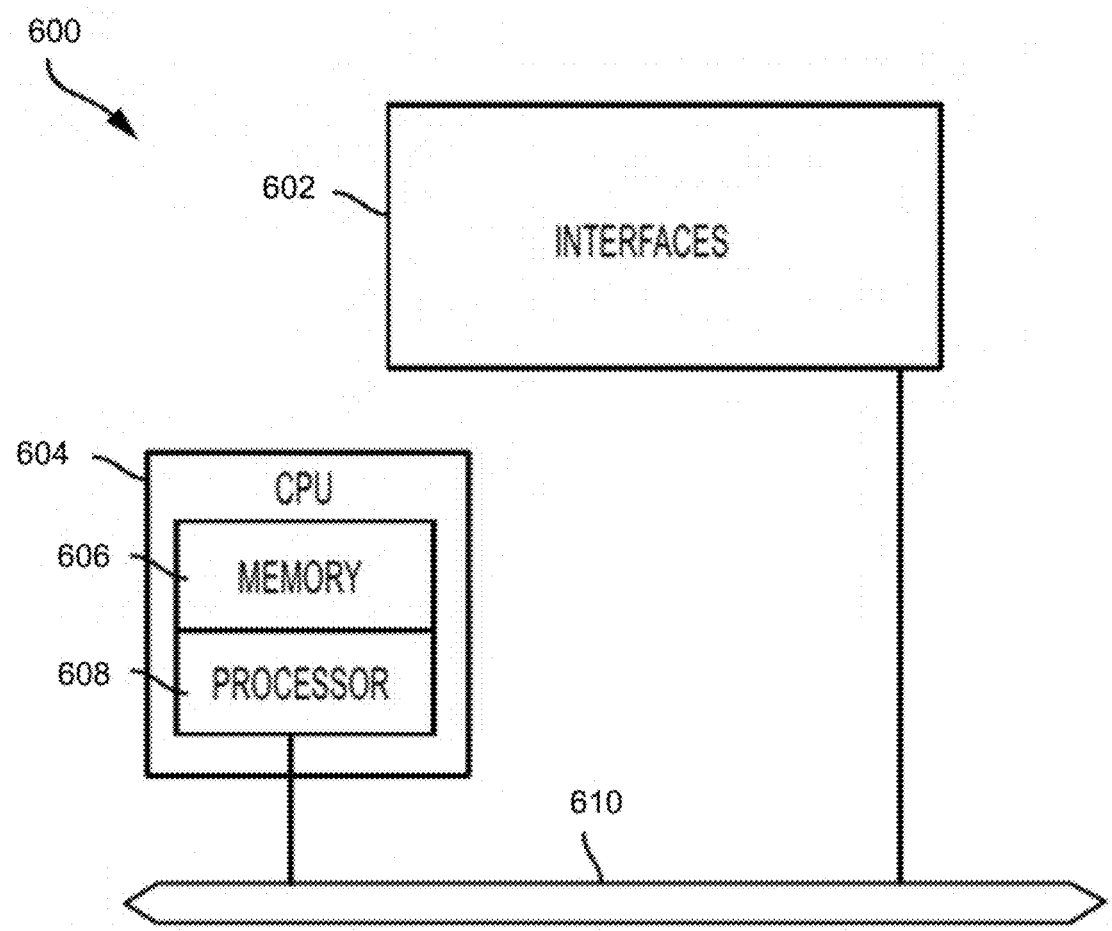
FIG. 6 illustrates an example network device in accordance with various examples.

FIG. 6 illustrates an example network device 600 suitable for implementing policy agents and performing switching, routing, and other networking operations. In some examples, the CBSDs 104A-D can be configured according to the architecture of the network device 600. In some examples, the network device 600 may be configured to perform the process 500 of FIG. 5. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, the processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC) 612, which can be configured to perform routing and/or switching operations. The ASIC 612 can communicate with other components in the network device 400 via the connection 610, to exchange data and signals and coordinate various types of operations by the network device 600, such as routing, switching, and/or data storage operations, for example.

Figure 7:
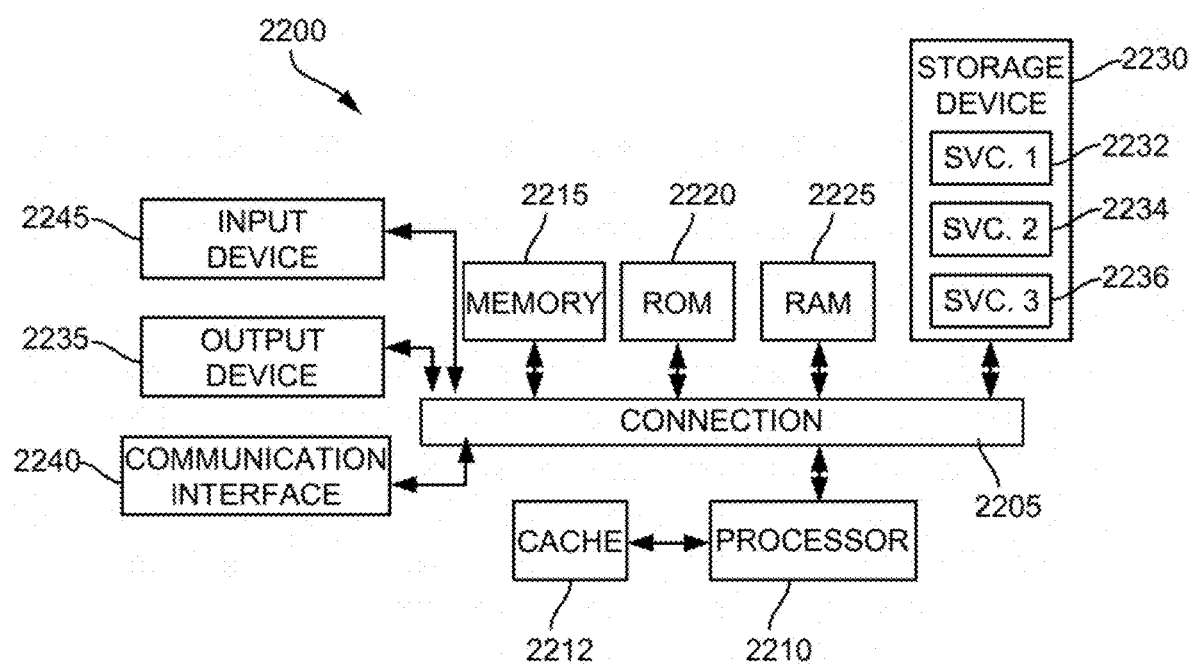
FIG. 7 illustrates an example computing device in accordance with various examples.

FIG. 7 illustrates a computing system architecture 700 wherein the components of the system are in electrical communication with each other using a connection 705, such as a bus. In some examples, the computing system architecture 700 can be used for performing the process 500 and/or implementing one or more elements of the CBRS networks described here. The example system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 530, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   obtaining group type information associated with a set of citizens broadband radio service (CBRS) networks;
   obtaining one or more radio environment map (REM) reports of one or more frequency channels associated with the set of CBRS networks; and
   based on the group type information and the one or more REM reports, allocating a frequency channel to each CBRS network of the set of CBRS networks;
   wherein the group type is received in:
   a spectrum inquiry request from a user equipment; or
   registration of the user equipment with a dynamic Spectrum Access System.

2. The method of claim 1, further comprising receiving one or more of channel utilization information, transmission power, or mobility load management information for a CBRS device (CBSD) based on the group type and the one or more REM reports.

3. The method of claim 1, further comprising obtaining one or more REM reports of one or more peer CBRS devices (CBSDs) over a virtual radio (X2) interface for communication between CBSDs of a group of CBSDs.

4. The method of claim 3, further comprising sharing mobility management information of user equipment (UE) connected to one or more CBSDs of the group of CBSDs over the X2 interface.

5. The method of claim 4, further comprising performing a handoff of the UE between two CBSDs of the group of CBSDs based on mobility information for the UE shared over the X2 interface between the two CBSDs.

6. The method of claim 1, wherein a REM report of the one or more REM reports comprises one or more of a channel utilization value, a channel hopping radio scanning report, identities of neighboring CBRS devices (CBSDs), a signal strength of neighboring CBSDs, interference information for neighboring CBSDs, or an identity of a synchronization domain of a CBSD associated with the REM report.

7. A system comprising:
one or more processors; and
a non-transitory computer-readable storage medium containing instructions which, when executed by the one or more processors, cause the one or more processors to:
obtain group type information associated with a set of citizens broadband radio service (CBRS) networks;
obtain one or more radio environment map (REM) reports of one or more frequency channels associated with the set of CBRS networks; and
based on the group type information and the one or more REM reports, allocate a frequency channel to each CBRS network of the set of CBRS networks;
wherein the group type is received in:
a spectrum inquiry request from a user equipment; or
registration of the user equipment with a dynamic Spectrum Access System.

8. The system of claim 7, wherein the group type information is obtained via a CBRS device (CBSD), wherein the CBSD is a master CBSD of a group of CBSDs associated with the group type, the group of CBSDs comprising the master CBSD and one or more peer CBSDs.

9. The system of claim 7, wherein the instructions, when executed by the one or more processors, cause the one or more processors to obtain one or more REM reports of the one or more peer CBRS devices (CBSDs) over a virtual radio (X2) interface for communication between CBSDs of a group of CBSDs.

10. The system of claim 9, wherein the instructions, when executed by the one or more processors, cause the one or more processors to share mobility management information of user equipment (UE) connected to one or more CBSDs of the group of CBSDs over the X2 interface.

11. The system of claim 10, wherein the instructions, when executed by the one or more processors, cause the one or more processors to perform a handoff of the UE between two CBSDs of the group of CBSDs based on mobility information for the UE shared over the X2 interface between the two CBSDs.

12. The system of claim 7, wherein a REM report of the one or more REM reports comprises one or more of a channel utilization value, a channel hopping radio scanning report, identities of neighboring CBRS devices (CBSDs), a signal strength of neighboring CBSDs, interference information for neighboring CBSDs, or an identity of a synchronization domain of a CBSD associated with the REM report.

13. A non-transitory computer-readable storage medium comprising instructions stored thereon which, when executed by one or more processors, cause the one or more processors to:
obtain group type information associated with a set of citizens broadband radio service (CBRS) networks;
obtain one or more radio environment map (REM) reports of one or more frequency channels associated with the set of CBRS networks; and
based on the group type information and the one or more REM reports, allocate a frequency channel to each CBRS network of the set of CBRS networks;
wherein the group type is received in:
a spectrum inquiry request from a user equipment; or
registration of the user equipment with a dynamic Spectrum Access System.

14. The non-transitory computer-readable storage medium of claim 13, wherein the group type information is obtained via a CBRS device (CBSD), wherein the CBSD is a master CBSD of a group of CBSDs associated with the group type, the group of CBSDs comprising the master CBSD and one or more peer CBSDs.

15. The non-transitory computer-readable storage medium of claim 13, wherein a REM report of the one or more REM reports comprises one or more of a channel utilization value, a channel hopping radio scanning report, identities of neighboring CBRS devices (CBSDs), a signal strength of neighboring CBSDs, interference information for neighboring CBSDs, or an identity of a synchronization domain of a CBSD associated with the REM report.

* * * * *